United States Patent Office 3,795,648
Patented Mar. 5, 1974

3,795,648
SURFACTANT-FREE AMPHOLYTIC POLYMERIC LATICES
Carlos M. Samour, Wellesley Hills, and Philip A. Mitchell, East Walpole, Mass., assignors to The Kendall Company, Walpole, Mass.
No Drawing. Continuation of abandoned application Ser. No. 720,462, Apr. 11, 1968. This application Apr. 27, 1971, Ser. No. 137,979
Int. Cl. C08f 15/20
U.S. Cl. 260—29.6 HN          11 Claims

ABSTRACT OF THE DISCLOSURE

Single-species polymeric latices of enhanced wet strength as bonding agents are prepared by copolymerizing a major portion of ethylenically-unsaturated monomer or monomers with a minor portion of an ampholytic monomer in the form of half-ester or acid-amide derivatives of maleic, itaconic, and citraconic acids. The latter are prepared by reacting the appropriate acid anhydride with certain diamines or amino alcohols.

---

This application is a continuation of our copending application Ser. No. 720,462, filed Apr. 11, 1968, now abandoned.

This invention relates to new polymeric dispersions of cationic polymers, in which the cationic portion of the polymer serves to stabilize the dispersion. More particularly it refers to cationic polymeric dispersions which are ampholytic in nature.

Polymeric latices are for the most part conventionally produced by an emulsion polymerization process, in which monomeric materials are polymerized while they are dispersed in an aqueous medium by means of a surface active agent. The surface active agent may be anionic in nature, such as soap flakes or sodium lauryl sulfate. Alternatively, it may be of a nonionic type as represented by various ethylene oxide derivatives, or by polyhydroxy compounds, or it may be cationic, as represented by alkyl ammonium halides. Cationic active agents are preferably combined with a nonionic agent for improved performance. The polymerization of monomeric materials is also frequently effected in the presence of water-soluble protective colloids or stabilizing agents. Any of the above emulsifying agents leads to the presence of a water-sensitive ingredient in the final polymeric latex. For latex utilization wherein wet strength is desirable, as in paper coatings, nonwoven fabrics, certain pressure-sensitive adhesive tapes, and the like, the presence of such water-sensitive material is deleterious.

It is therefore an object of this invention to prepare new cationically-stabilized polymeric dispersions, free from surfactants, wherein the dispersions are stabilized by the presence of cationic groups on the polymeric molecule, and wherein the polymer may be precipitated from the dispersion by neutralization of the cationic charge.

An additional object of the invention is the utilization of such polymeric latices for the preparation of bonded nonwoven fabrics.

A more specific object of the invention is the preparation of new polymeric dispersions in which at least one ethylenically-unsaturated monomer species is co-polymerized with at least one nitrogen-containing salt-forming monomer which contains a carboxyl group.

In addition to being precipitated by the addition of alkali, the polymeric dispersions of this invention are characterized by the fact that they are converted from cationic to anionic form by adding the cationically-stabilized polymeric dispersion, with stirring, to an excess of an alkaline solution, organic or inorganic, keeping the mixture alkaline at all times. This is especially advantageous when it is desired to utilize these polymers in admixture with anionic polymers, or where the strongly acidic cationically-stabilized disperseion is to be used on a substrate that is acid-sensitive. Exemplary bases suitable for this inversion are ammonia, alkali metal hydroxides, dimethylamino ethanol, and soluble alkaline organic amino compounds in general.

In U.S. Pat. 3,399,159, issued Aug. 28, 1968, to one of the present inventors, there is described a process whereby cationic dispersions and cationic dispersing agents may be prepared by the use of such cationic monomers as various vinyl pyridines and such other nitrogen-containing monomers as dimethylaminoethyl methacrylate, tertiary-butylaminoethyl methacrylate, and amide-amines such as N-dimethylaminoethyl acrylamide. The general methods set forth in U.S. Pat. 3,399,159 for the preparation of polymeric dispersions, and their utilization as binders for nonwoven fabrics, are applicable here. It has in general been found, however, that for some unexplained reason, nonwoven fabric binder systems prepared from the polymeric dispersions of this invention impart higher wet-strength to nonwoven fabrics than do polymeric dispersions prepared according to U.S. Pat. 3,399,159. It may be due to the ampholytic nature of the present nitrogen-containing monomers, contributed by the presence of a free carboxyl group thereon, but the reason for such an effect remains obscure.

The ampholytic nitrogen-containing monomers suitable for the practice of the present invention are selected from the class represented by the following Formulas I and II:

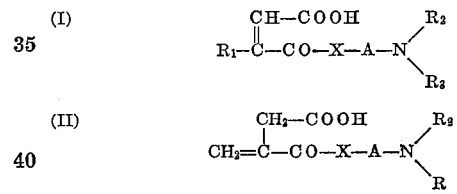

where $R_1$ is hydrogen or a methyl group,
X is oxygen or NH,
A is an alkylene group selected from the class consisting of linear and branched saturated hydrocarbon groups containing from 2 to 12 carbon atoms,
$R_2$ is a hydrogen atom or a saturated alkyl group of not more than four carbon atoms, $R_3$ is a hydrogen atom or a saturated alkyl group of not more than four carbon atoms, wherein the total sum of the carbon atoms in both $R_2$ and $R_3$ does not exceed four, and wherein only one of the groups $R_2$ and $R_3$ may be hydrogen.

The preferred compounds of this invention are those in which A is a dimethylene or propylene group, and $R_2$ and $R_3$ are methyl groups.

Typical examples of these classes of nitrogen-containing salt-forming compounds are the half-esters and the acid-amides formed by reacting the anhydrides of maleic, itaconic, and citraconic acids with substituted alcohols and amines such as dimethylaminoethanol and dimethylaminopropyl amine.

These ampholytic salt-forming compounds, in minor proportion, are reacted with a major proportion of an ethylenically unsaturated monomer, such as vinyl acetate, vinyl chloride, acrylonitrile, and acrylic monomers in general represented by the general formula

where $R_4$ is a hydrogen atom or a methyl group, and $R_5$ is a saturated alkyl radical of 1 to 8 carbon atoms. As is known in the art of preparing acrylic ester polymers, the softness of the polymer and the difficulty of initiating polymerization increase as the number of carbon atoms in the ester group increases. In the practice of this invention, when the acrylic monomer contains more than 4 carbon atoms in the ester group, it is advantageous to mix therewith at least about 20% of an acrylic ester with fewer than 4 carbon atoms in the ester group to initiate polymerization and enhance the stability of the dispersion.

Mixtures of more than one such ethylenically-unsaturated monomer may be used, and in order to impart special properties of toughness, rigidity, or cross-linking reactivity to the polymer, a minor proportion, usually less than 20 mole percent, of the major monomers may be replaced by some other ethylenically-unsaturated monomer such as vinyl esters, typified by vinyl laurate and vinyl stearate; vinyl ethers such as vinyl methyl ether, vinyl ethyl ether, and vinyl butyl ether; di-unsaturated monomers such as diethylene glycol diacrylate, ethylene glycol diitaconate, diallyl phthalate, divinyl benzene and the like; acrylic and methacrylic acids, acrylamide and methacrylamide, hydroxyethyl acrylate and methacrylate, and hydroxypropyl acrylate and methacrylate.

The preparation of these cationically-stabilized polymeric dispersions is conveniently carried out in an acidified aqueous medium, as is set forth in detail in the examples below. In general, a pH of between 1.0 and 3.5 has been found most effective, with a preferred range of 1.5 to 2.5. Such a pH may be realized by the use of highly dissociated acids such as hydrochloric, nitric, sulfuric, formic, or phosphoric acid, or other strong acids which have a dissociation constant below 5.0 and preferably below 3.0.

The catalyst system employed in the polymerization is a redox catalyst, consisting of an oxidizing agent and a reducing agent both of which have some water solubility. The oxidizing agent may be, for example, ammonium persulfate, hydrogen peroxide, tertiary butyl peroxy maleic acid, tertiary octyl hydroperoxide, 2-5-dimethyl-hexyl-2-5-dihydroperoxide, methyl ethyl ketone peroxide, and the like. The reducing agent may be ascorbic acid, dihydroxy maleic acid, reducing sugars, and the like, together with a metal ion capable of existing in two valence states, such as ferrous, cuprous, vanadyl, stannous, and the like. Such redox catalyst systems promote rapid initiation of polymerization, which minimizes the accumulation of unreacted monomer in the dispersion. Such an accumulation is undesirable, since unreacted monomer is usually a solvent for partially polymerized material, so that the presence of dispersed but unreacted monomer leads to the formation of agglomerated particles and even to coagulum.

Coagulum in a latex dispersion is unusable polymer, and not only reduces the yield of effective polymer dispersion but must be removed by filtration or settling before the dispersion can be used as, for example, a binder for nonwoven fabrics. Therefore, it is desirable that the monomers be maintained in proper proportion to each other during the preparation of the polymeric dispersion. If the cationic monomer is present in the polymerizing system for an appreciable time in a mole ratio in excess of the limits set forth herein, a polymer will be formed which is water-soluble or water-sensitive, which will defeat the primary objective of preparing polymer compositions of enhanced resistance to the effects of water. If the non-cationic monomer is present in excess, it will dissolve or swell the desired polymeric particles already formed, and coagulum will result.

The ampholytic monomers suitable for polymerization may be prepared generally as follows:

To a given amount of the appropriate amino alcohol or diamine dissolved in a suitable solvent such as methyl acetate there is added, with stirring, a stoichiometric amount of the appropriate anhydride (maleic, itaconic, or citraconic). Upon standing, the acid ester or acid amide precipitates as a white or tan colored crystalline solid. The excess solvent is decanted, the crystalline material washed once or twice with fresh solvent, and dried. The reaction products are generally hygroscopic, and are kept in sealed containers or put into aqueous solution.

As set forth above, it is desirable that the various monomers be added to the reaction vessel in more or less simultaneous and proportional increments, in order to avoid the temporary excess of one of the monomers with the formation of coagulum or water-sensitive fractions. In batch processes it is possible to dissolve all of the ampholytic monomer in the water acid system and then add the second monomer or mixture of monomers, together with the catalyst system, provided that the latter monomers are essentially insoluble in water. In case the major monomer or an element thereof has an appreciable water solubility, however, disproportionation may occur. Our preferred method, therefore, is to add both the ampholytic monomer and the major monomers to the reaction mixture so that the proportions of the two stock feeds are maintained in substantially the ratio in which they are desired to appear in the final polymer.

Another general consideration in the selection of monomers for the process of this reaction is the proportion of major ethylenically unsaturated monomers to the minor ampholytic salt-forming monomer. The latter is responsible for the fact that a self-stabilized, surfactant-free polymeric dispersion system is formed, in which the dispersing and stabilizing action comes from the fact that the ampholytic polymer is not a separate species, acting as dispersing agent and existing apart from the major polymer, but instead is an integral part of a one-component dispersed polymer. Therefore, the formation of any appreciable amount of the homopolymer of the ampholytic monomer is to be avoided, since such species are water-soluble or highly water-sensitive, and it is desired that the polymeric dispersions produced according to this invention be relatively water-insensitive. It has been found in general that when the half-esters or acid amides of Formulas I and II above are used as ampholytic dispersing monomers, best results are obtained when the ratio of 1 to 6 mole percent ampholytic monomer: 99 to 94 mole percent other ethylenically-unsaturated monomers is maintained during substantially all of the polymerization reaction.

The invention will be illustrated by the following examples.

EXAMPLE I

A monomeric mixture of 45 parts of ethyl acrylate, 30 parts of butyl acrylate, and 25 parts of vinyl acetate was continuously and thoroughly emulsified in water in the ratio of 1 part of mixed monomers to 4 parts of water, by weight. Thorough emulsification is desirable to prevent formation of an unreacted monomer layer in the polymerization vessel, and may be assisted in efficient stirring in said vessel, or by blending the monomers in a colloid mill.

To the above monomeric emulsion there was added an aqueous solution of ferrous ammonium sulfate 1 part, ascorbic acid 4 parts, at such a rate that there was maintained a constant ratio of 1 part of ferrous ammonium sulfate to 1,000 parts of mixed monomers. In this ferrous ammonium sulfate-ascorbic acid solution there was also dissolved the half-ester obtained by reacting maleic anhydride with dimethylamino ethanol, as set forth above. The half-ester was added to the mixture of emulsified ethyl acrylate-butyl acrylate-vinyl acetate so that the ratio was 3 parts of half-ester to 97 parts of mixed monomers, a mole ratio of 1.6 mole percent of ampholytic half-ester to 100 mole percent of mixed ethylenically-unsaturated major monomers.

Phosphoric acid, 9 N, was also added continuously to the mixture of monomers, ferrous sulfate, and ascorbic acid, so as to maintain a ratio of 1 part of phosphoric acid to 53 parts of ethyl acrylate-butyl acrylate-vinyl acetate. This resulted in a pH of between 1.5 and 2.0.

The mixture of major monomers, half-ester, ferrous sulfate, ascorbic acid, and phosphoric acid was fed to a 5-liter polymerization flask until the flask was half-filled together with a stream of hydrogen peroxide sufficient to maintain a ratio of 1 part of hydrogen peroxide to 320 parts of monomer. Polymerization started almost immediately. The temperature was maintained at about 60° C. while the simultaneous but separate addition of mixed monomers and peroxide was carried out.

The resulting cationic latex had a pH of 2.7 and a solids content of 19.8%. The milky white emulsion was free from coagulum and large particles.

The latex was diluted to 10% solids and used to bond a carded web of viscose rayon fibers weighing 16 grams per square yard. The binder pickup was 25%, so that the binder content was 20% of the weight of the dried product. As an index of strength, the wet crosswise tensile strength was measured and found to be 0.78 pound per inch-wide strip.

A control latex was prepared using the same amounts of major monomers and other reactants in the procedure set above, except that the half-ester of Example I was replaced by a mole-equivalent amount of dimethylaminoethyl methacrylate. This control experiment yielded a latex which, when applied to the same fibrous web and at the same level as above, gave a product with a wet crosswise tensile strength of 0.19 pound.

EXAMPLE II

An ampholytic polymeric latex was prepared using the same mole equivalents of the same reactants as Example I, except that the half-ester of maleic acid was replaced by the half-amide formed by reacting itaconic anhydride with a stoichiometric amount of dimethylamino-n-propylamine. The latex thus produced, applied to the fibrous web of Example I, gave a product with a wet crosswise strength of 0.75 pound per inch-wide strip.

A control latex with a mole-equivalent amount of dimethylaminoethyl methacrylate replacing the half-amide gave a product with a wet crosswise strength of 0.19 pound.

EXAMPLE III

An ampholytic polymeric latex was prepared according to the procedure of Example I except that major monomer consisted of 40 parts of vinyl acetate, 40 parts of ethyl acrylate, and 20 parts of 2-ethylhexyl acrylate. The latex thus produced, when applied to the fibrous web of Example I at a 25% pickup level, gave a product with a crosswise wet strength of 0.78 pound per inch-wide strip.

A control latex was prepared similar to the foregoing except that the half-ester reaction product of maleic anhydride and dimethylamino ethanol was replaced by a mole-equivalent amount of dimethylaminoethyl methacrylate. The wet crosswise strength of the web saturated with this control latex was 0.20 pound per inch-wide strip.

EXAMPLE IV

A preparation similar to Example III was made, except that the major monomer consisted of 100 parts of vinyl acetate. The latex thus produced was stable, and when applied to the fibrous web of Example I at a 25% pickup level, gave a product with a wet strength of 0.78 pound per inch-wide strip.

When the prepaartion was repeated using a mole-equivalent amount of dimethylaminoethyl methacrylate in place of the half-ester reaction product of maleic anhydride and dimethylaminoethanol, coagulation occurred during the polymerization, and a usable latex was not obtained.

Essentially similar stable latices were formed when the major monomer of Examples III and IV was (a) a homopolymer of ethyl acrylate, or (b) a mixture of 46 parts of vinyl acetate and 54 parts of butyl acrylate.

Comparable results are obtained when the A portion of Formulas I and II contains more than 2 or 3 carbon atoms, but the room-temperature stability of the latex apparently decreases. For instance, when the amine alcohol or diamine of Examples I and II were replaced by N,N dimethylamino-n-hexyl amine, the final ampholytic latex was stable at elevated temperatures, while at room temperature there was some settling out of solids. Therefore, although the longer chain amines are useful, we prefer to use amines or amine alcohols of from two to four carbon atoms.

Having thus described our invention, we claim:

1. A surfactant-free aqueous dispersion of a cationically-stabilized ampholytic polymer which consists essentially of:
    a minor portion of between 1 and 6 mole percent derived from an ampholytic monomer selected from the class consisting of monomers represented by the formulas

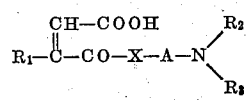

and

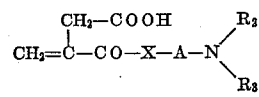

where $R_1$ is hydrogen or a methyl group, X is oxygen or NH, A is an alkylene group selected from the class consisting of linear and branched hydrocarbon chains containing from 2 to 12 carbon atoms, and $R_2$ and $R_3$ are hydrogen atoms or saturated alkyl groups of not more than 4 carbon atoms, wherein the total sum of the carbon atoms in $R_2$ and $R_3$ does not exceed 4, and $R_2$ and $R_3$ are not both hydrogen;
said ampholytic monomer introducing into the polymer an equal number of carboxyl groups and amino groups, and a major portion derived from other ethylenically-unsaturated monomers selected from the class consisting of: vinyl acetate, vinyl chloride, acrylonitrile, and acrylic monomers represented by the formula

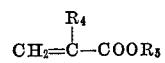

where $R_4$ is hydrogen or a methyl group and $R_5$ is a saturated alkyl radical of 1 to 8 carbon atoms.

2. The product according to claim 1 in which A is a saturated hydrocarbon chain of from 2 to 4 carbon atoms and $R_2$ and $R_3$ are methyl groups.

3. The product according to claim 1 in which the major portion of the polymer is selected from the class consisting of polymers of acrylic esters containing between 1 and 8 carbon atoms in the ester group.

4. The product according to claim 1 in which the major portion of the polymer is a homopolymer of vinyl acetate.

5. The product according to claim 1 in which the major portion of the polymer is selected from the class consitting of copolymers and terpolymers of acrylic esters of 1 to 8 carbon atoms in the ester group, and vinyl acetate.

6. The process of preparing a cationically-stabilized surfactant-free aqueous dispersion of an ampholytic polymer which consists essentially of
    polymerizing together in an acidified aqueous medium
    a minor portion of between 1 and 6 mole percent of at least one ampholytic monomer selected from the class consisting of

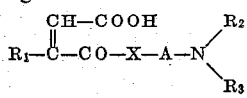

and

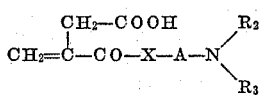

where
- $R_1$ is hydrogen or a methyl group,
- X is oxygen or NH,
- A is an alkylene group selected from the class consisting of linear and branched hydrocarbon chains containing from 2 to 12 carbon atoms,
- and $R_2$ and $R_3$ are hydrogen atoms or saturated alkyl groups of not more than 4 carbon atoms, wherein the total sum of the carbon atoms in both $R_2$ and $R_3$ does not exceed 4, and $R_2$ and $R_3$ are not both hydrogen atoms;

together with a major portion of other ethylenically-unsaturated monomers selected from the class consisting of: vinyl acetate, vinyl chloride, acrylonitrile, and acrylic monomers represented by the formula

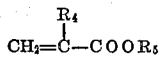

where $R_4$ is a hydrogen atom or a methyl group and $R_5$ is a saturated alkyl radical of 1 to 8 carbon atoms; said acidified aqueous medium having a pH of between 1.0 and 3.5.

7. The process according to claim 6 in which the proportion of ampholytic monomer to other ethylenically-unsaturated monomer is kept substantially constant throughout the course of the polymerization by adding the various types of monomer to the reaction in simultaneous and proportional increments.

8. The process according to claim 6 in which the group A in the minor monomer is a saturated hydrocarbon chain of between 2 and 4 carbon atoms and $R_2$ and $R_3$ are methyl groups.

9. The process according to claim 6 in which the major portion of other ethylenically-unsaturated monomers is selected from the class consisting of acrylic esters containing between 1 and 8 carbon atoms in the ester group.

10. The process according to claim 6 in which the major ethylenically-unsaturated monomer is vinyl acetate.

11. The process according to claim 6 in which the major ethylenically-unsaturated monomer is a mixture of vinyl acetate together with an acrylic ester which contains not more than 8 carbon atoms in the ester group.

References Cited

UNITED STATES PATENTS

| | | | |
|---|---|---|---|
| 3,282,879 | 11/1966 | Werner | 260—29.6 |
| 3,399,159 | 8/1968 | Samour et al. | 260—29.6 |

OTHER REFERENCES

Emulsion and Water-Soluble Paints and Coatings, "Surfactants," C. R. Masters, Reinhold Publishing Corp., 1964, pp. 43–47, 52.

ROBERT F. WHITE, Primary Examiner

J. B. LOWE, Assistant Examiner

U.S. Cl. X.R.

260—29.6 TA, 29.6 AN, 78.5 R